United States Patent

[11] 3,630,253

[72] Inventor Russell G. Sherman
 Santa Monica, Calif.
[21] Appl. No. 868,429
[22] Filed Oct. 22, 1969
[45] Patented Dec. 28, 1971
[73] Assignee The Lamson & Sessions Company
 Cleveland, Ohio

[54] INTERFERENCE FASTENER
 1 Claim, 4 Drawing Figs.
[52] U.S. Cl. .................................................. 151/41.73,
 85/21
[51] Int. Cl. ........................................................ F16b 39/00
[50] Field of Search .............................................. 151/41.73;
 85/19, 20, 21, 44; 287/189.36 F, 2, 126, 127;
 285/382

[56] References Cited
 UNITED STATES PATENTS
 2,058,520 10/1936 Sipe ............................... 151/41.73
 3,240,100 3/1966 Rose ............................... 85/19
 3,349,649 10/1967 Mele ............................... 151/41.73
 3,418,012 12/1968 La Torre ........................ 85/19

3,447,820 6/1969 Durnan ........................... 287/126
 FOREIGN PATENTS
 268,521 4/1927 Great Britain ................. 85/21
 831,795 3/1960 Great Britain ................. 151/41.73

Primary Examiner—Marion Parsons, Jr.
Attorney—Yount and Tarolli

ABSTRACT: An improved interference fastener includes a metallic shank having waves for interfering with the inner surfaces of holes formed in metallic members to be interconnected by the fastener. The waves have an amplitude of between 0.001 and 0.004 of an inch and include a series of protuberances or crests which interfere with the metallic members. This interference improves fatigue life by prestressing the members around the holes to thereby reduce the variation in stress or load span to which this area is effectively subjected when a varying or alternating load is applied in the members. In addition, the interference retards relative movement between the fastener and the members. The waves also provide a series of circular recesses or troughs having bottom or innermost portions which are spaced from the members to reduce metal-to-metal contact between the fastener and the members.

PATENTED DEC 28 1971

3,630,253

INVENTOR
RUSSELL G. SHERMAN
BY Yount and Tarolli
ATTORNEYS

INTERFERENCE FASTENER

This invention relates generally to a fastener and more particularly to a metallic interference-type fastener for interconnecting metallic members.

It is an object of this invention ro provide a new and improved metallic fastener which interferes with the inner surfaces of holes in interconnected metallic members to thereby prestress the members around the holes to improve the fatigue life of the members by reducing the effective load variation or span to which the prestressed area is subjected when an alternating or varying load is applied to the members.

It is another object of this invention to provide a new and improved interference metallic fastener which tends to minimize the force required to install the fastener by reducing metal-to-metal contact between the metallic fastener and metallic members to the interconnected by the fastener.

It is another object of this invention to provide a new and improved metallic interference fastener with a shank having waves formed thereon to form a series of circular crests and troughs which extend around the shank to provide interference between radially outer portions of the crests and metallic members to be interconnected and to provide space between radially inner portions of the troughs and the members to be interconnected.

Another object of this invention is to provide a new and improved interference fastener having a shank with a continuous outer surface which tends to minimize the formation of stress concentrations in the fastener and galling between the fastener and metallic members to be interconnected upon installation of the fastener.

These and other objects and features of the invention will become more apparent upon a consideration of the following description taken in connection with the accompanying drawings wherein.

When a pair of metallic members are to be interconnected by bolts or other metal fasteners, holes are commonly provided in the members for receiving the fastener. These holes result in the formation of stress concentrations in the metallic members and tend to reduce the fatigue life of the members when they are subjected to alternating or varying loads. The stress concentrations are such that when the metallic members are subjected to alternating loads, cracks or discontinuities develop in the metal immediately adjacent to the holes formed in the members. One these cracks or discontinuities develop, the members soon fail under continued loading.

To improve the fatigue life of a pair of metallic members 10 and 12 interconnected by a metallic fastener 14, constructed in accordance with the present invention, the fastener prestresses the members in the area around holes 16 and 18 through the members. This prestressing of the members 10 and 12 around the holes 16 and 18 forms an amount of level of stress which is constant until a load to which the members are subjected is sufficient to induce a level of stress equal to the prestress. Further increasing of the load to which the members 10 and 12 are subjected when raises the amount or level of stress around the holes 16 and 18 to a level above the prestress level. The variation or span of stress change in members 10 and 12 around the holes 16 and 18 is equal to the difference between the induced stress and the prestress. Thus, prestressing of the members 10 and 12 in the areas around the holes 16 and 18 decreases the range or span of stress variation to which these areas of the members are subjected by an alternating or varying load. Of course this improves the fatigue or endurance life of the members 10 and 12 by reducing the cyclic variation in stress around the holes 16 and 18 when the members are subjected to a varying or alternating load.

Figure 1:
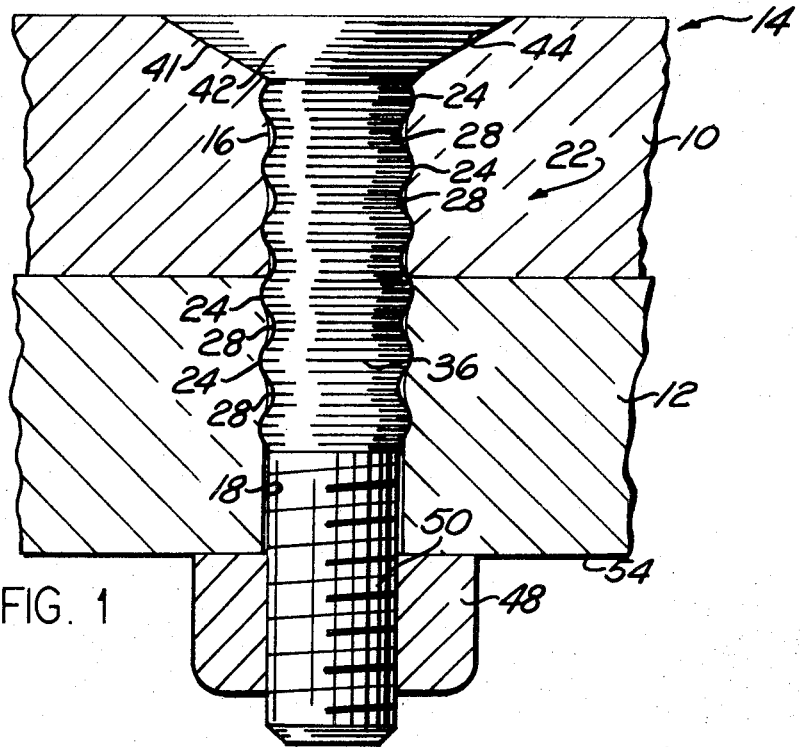
FIG. 1 is a sectional view illustrating the interconnection of a pair of members by a fastener embodying the present invention.
Figure 2:
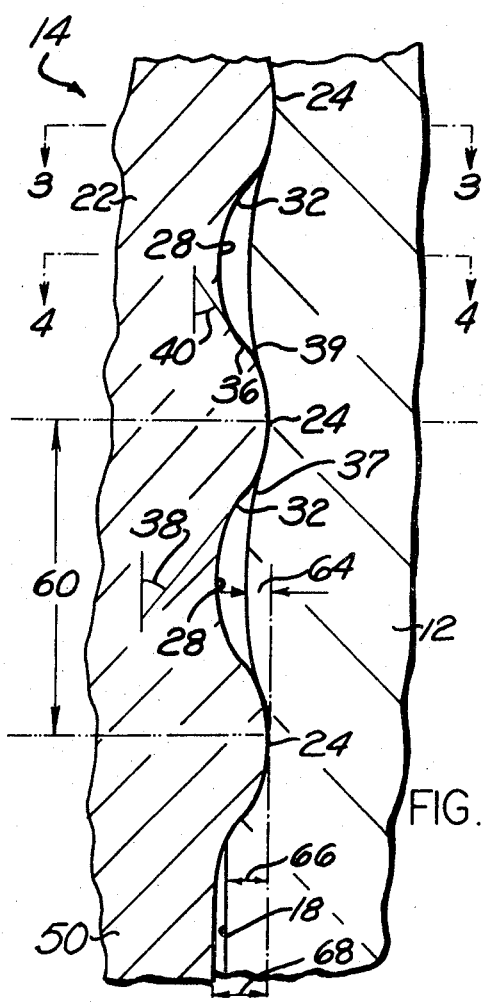
FIG. 2 is an enlarged fragmentary sectional view further illustrating the relationship between the fastener and one of the members.
Figure 3:
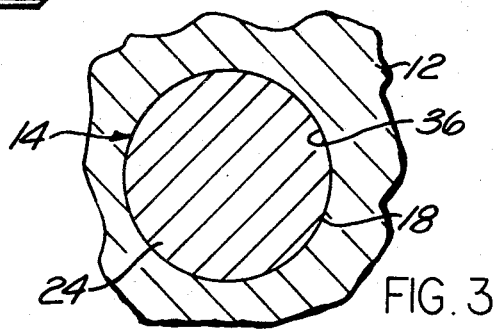
FIG. 3 is an enlarged fragmentary sectional view, taken generally along the line 3—3 of FIG. 2, illustrating the interference between the shank of the fastener and one of the members.

To enable the metallic fastener 14 to prestress the metallic members 10 and 12 in the area immediately adjacent to holes 16 and 18 through which the fastener extends, the fastener 14 has an axially extending shank 22 with a plurality of circular protuberances or crest 24 which interfere with the cylindrical inner walls of the holes 16 and 18 (see FIGS. 1-3). This interference between the crests 24 and the members 10 and 12 provides high-local stresses around the holes 16 and 18. Since the area around the holes 16 and 18 is prestressed by the interference between the crests 24 and the members 10 and 12, when the members are subjected to a varying or alternating load the variation in the stresses induced in the members around the holes is minimized or reduced by an amount corresponding to the prestressing of the area around the holes. Therefore, the span or extent of change in the stress around the holes 16 and 18 when the members 10 and 12 are subjected to an alternating or varying load is reduced. As is well-known to those skilled in the art, reducing the extent of variation of stress in members subject to a cyclic load improves fatigue or endurance life of the members.

Figure 4:
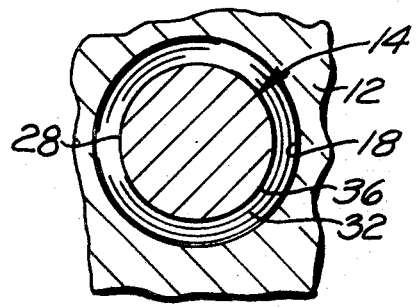
FIG. 4 is a sectional view, taken generally along the line 4—4 of FIG. 2, illustrating the spacing of a portion of the shank of the fastener from the one member.

To reduce or tend to minimize the force required to locate the fastener 14 in the holes 16 and 18, circular recesses or troughs 28 (FIGS. 2 and 4) are provided between the crests 24 to reduce metal-to-metal contact between the metallic shank 22 and the metallic members 10 and 12. The troughs 28 result in the formation of annular spaces or voids 32 between the shank 22 of the fastener and the members. These voids 32 reduce the frictional contact between the shank 22 and the members to thereby tend to reduce or minimize the resistance encountered to inserting or installing the fastener 14 in the holes 16 and 18 in the members 10 and 12.

The circular protuberances or crest 24 and recesses or troughs 28 extend around the shank 22 in a direction which is perpendicular to a longitudinal axis of the fastener 14. However, it is contemplated that the crests 24 and troughs could be skewed slightly relative to the longitudinal axis of the fastener. The crests 24 and the troughs 28 are formed and interconnected in such a manner that a manner that the outer or peripheral surface 36 of shank 22 has a generally sine wave cross-sectional configuration in an axial plane (See FIG. 2). While the crests 24 and troughs 28 can have cross-sectional configurations other than the one illustrated in FIGS. 1 and 2, the surface 36 is preferably a continuous surface. By being continuous it is meant that the surface 36 is free of intersections between planar surfaces so that there are no portions on the periphery of the surface 36 formed by a line. The continuous configuration of the surface 36 tens to minimize or at least reduce stress concentrations within the shank 22 of the fastener 14. Of course, the continuous smoothly flowing generally sine wave configuration of the outer surface 36 reduces any tendency for galling or scoring to occur between the fastener 14 and the members 10 and 12 as the fastener is being inserted into the holes 16 and 18.

The generally sine wave configuration of the outer surface 36 facilitates inserting the fastener in the holes 16 and 18 and promotes a flow of metal back around the crests 24 and into the troughs 28 as the fastener 14 is inserted into the holes 16 and 18. To tend to minimize the force required to install the fastener 14, the waves formed by the crests 24 and troughs 28 have leading surfaces 37 which slope or incline outwardly at an angle, indicated at 38 in FIG. 2, from a longitudinal axis of the fastener. The waves also have the same forward and backward trailing surfaces 39 which slope or incline inwardly at the same angle, indicated at 40 in FIG. 2, relative to the longitudinal axis of the fastener. The back flow of metal provides a secure gripping action between the fastener 14 and the members 10 and 12 to resist both axial withdrawal of the fastener from the holes 16 and 18 to prevent rotation of the fastener in the holes.

Once the fastener 14 has been inserted into the holes 16 and 18 so that an inner bearing surface 41 (FIG. 1) on head 42 presses against an outer surface 44 of the innermost member 10, the members 10 and 12 are clamped together by engaging an internally threaded nut 48 with an externally threaded outer and portion 50 of the fastener. While the nut 48 is being threaded on to the outer end 50 and tightened against an outer surface 54 of the member 12 to securely clamp the members 10 and 12 between the head 42 and nut, the fastener 14 is retained against rotation in the holes 16 and 18 by the interference between the protuberances 24 and the members. This enables the nut to be secured to the fastener 14, once the fasteners has been inserted into the holes 16 and 18, by a single workman without the services of a second workman to hold the head 42 against rotation and axial displacement. In addition, the interference between the protuberances 24 and the members 10 and 12 retains the members against slipping or displacement relative to each other.

In specific preferred embodiments of the fastener 14, the wave forming the outer surface 36 of the fastener has a pitch (indicated at 60 in FIG. 2) of between 0.05–0.8 times the diameter of the holes 16 and 18. When the pitch 60 is equal to approximately 0.6 times the diameter of the holes 16 and 18, and flow of the metal of the members 10 and 12 into the recesses or troughs 28 is maximized and the radial extent of the spaces 32 is minimized. By experimentation, it has been determined that the radial extent of the flow of metal (indicated at 64 in FIG. 2) behind the protuberances or crests 24 is equal to a maximum of approximately 0.25 times the radial interference between the protuberances 24 and the members. As was previously mentioned, this maximum inward backflow of the metal forming the members occurs when the pitch of the wave forming the outer surface 36 is equal to approximately 0.6 times the diameter of the hole. However, at 0.3 times the diameter the radial extent of flow of metal into the recesses or troughs 28 is substantially zero and at less than 0.3 times the diameter the radial extent of flow of metal into the recesses or troughs 28 is substantially zero and at less than 0.3 times the diameter the radial extent of flow of metal is positive or outward and the entire hole becomes larger.

The interference between the protuberance or crests 24 and the members 10 and 12 corresponds to the difference between the inside diameter of the holes 16 and 18 and the outside diameter of the crests or protuberances 24. This interferences distance is indicated at 66 in FIG. 2. The interference distance 66 is usually less than the amplifier 68 of the sine wave forming the surface 36. In specific preferred embodiments of the invention, the amplitude 68 is between 0.001 and 0.005 of an inch. Of course, the amplitude 68 and interference 66 vary in accordance with the diameter of the shank 22 and holes 16 and 18 and with variations in the metal from which the members 10 and 12 are made.

Although the surface 36 has a sine wave configuration as shown herein, it is contemplated that shape of this wave could be modified to have a crest with an amplitude which is greater than the amplitude of the associated troughs. In one specific embodiment of the invention the crest amplitude is approximately 0.002 inches and the trough amplitude is 0.001 inches to form a continuous wave having a standing height of 0.003 inches. The relatively shallow depth of the trough enables a relatively large number of these modified waves to be provided in a unit of shank length. It is contemplated that the outside diameter of the wave crests could be progressively increased in a direction away from the threaded end portion 50 to provide progressively increasing interference between the fastener and the associated members 10 and 12.

In view of the foregoing description, it can be seen that the interference fastener 14 interferes with the inner surface of the holes 16 and 18 in the interconnected members 10 and 12 to prestress the members around the holes. This prestressing of the members 10 and 12 around the holes improves the fatigue or endurance life of the members by reducing the extent to which the stress in the members varies around the holes when the members are subjected to varying or alternating loads. To provide this prestress, the fastener 14 includes a shank 22 having circular protuberances or crests 24 which interfere with the inner surfaces of the holes 16 and 18. The outer surface 36 of the shank 22 of the fastener 14 preferably has a continuous surface to tend to minimize the stress concentrations in the shank of the fastener.

The continuous, generally sine wave configuration of the outer surface 36 also facilitates insertion of the fastener 14 into the holes 16 and 18 even though there is interference between the protuberances or crest 24 and the members 10 and 12. This is because the wavelike configuration promotes a flow of metal as the shank 22 is forced into the holes 16 and 18. In addition, the wavelike configuration of the surface 36 provides recesses or troughs 28 which reduce metal-to-metal contact between the fastener 14 and the members 10 and 12 to thereby tend to reduce the resistance to insertion of the fastener into the holes 16 and 18.

Having described my invention I claim:

1. A metallic interference member adapted to be mounted on a metallic base member having a hole for receiving said interference member, said interference member comprising a body adapted to extend into the hole in the metallic base member, a plurality of axially extending waves form an outer surface on said body to interfere with inner surfaces of the hole in the metallic base member to thereby prestress the metallic base member around the hole to improve fatigue life of the metallic base member, said waves including a continuous series of evenly spaced crests and troughs having circular cross sections in planes perpendicular to a longitudinal axis of said interference member, said waves having an amplitude of between 0.001 and 0.005 of an inch and a crest diameter which is greater than the inside diameter of the hole in the metallic base member by an amount which is less than the amplitude of said waves to provide interference between the inner surface of the hole in the metallic base member and said crests to prestress the metallic base member around the hole, said crests being axially spaced apart by a distance of between 0.05 and 0.8 times the diameter of the hole in the metallic base member to provide for interference between the surfaces of the hole in the metallic base member and said body of the interference member at a plurality of axially spaced apart locations along said body, said crests having a cross-sectional configuration in an axial plane which is the same as the cross-sectional configuration of the crests of a sine wave and having leading and trailing surfaces which have the same angular slope relative to the longitudinal axis of the fastener to promote a flow of metal around the crests upon insertion of the fastener into the holes in the metallic member, each of said troughs having a sloping trailing surface portion which forms a smooth continuation of the leading surface of one of said crests and a sloping leading surface portion which forms a smooth continuation of a trailing surface of a next adjacent one of said crests with a continuously curving concave center surface portion interconnecting said leading and trailing surface portions to form said shank with a continuously curving outer surface which is free of stress inducing discontinuities and which facilitates insertion of said interference member into the hole in the metallic base member, said concave center surface portions of said troughs having radially innermost surface portions which are spaced from the inner surface of the hole in the metallic base member to thereby tend to minimize metal-to-metal contact between said body and said metallic base member to further facilitate insertion of said interference member into the hole in the metallic base member.

* * * * *